Aug. 15, 1933.  H. PETERSON  1,923,039

ANIMAL TRAP

Filed June 27, 1932

Inventor
Hans Peterson
per Arthur F. Holmes
Attorney

Patented Aug. 15, 1933

1,923,039

UNITED STATES PATENT OFFICE 1,923,039

ANIMAL TRAP

Hans Peterson, Readstown, Wis.

Application June 27, 1932. Serial No. 619,411

4 Claims. (Cl. 43—89)

This invention relates to animal traps particularly designed for moles and gophers.

The primary object of this invention is to provide a new and novel type of trap designed so that the jaws thereof are inserted in the ground surrounding the animal run-way, and to provide a new and novel method of springing the trap so that the body of the animal is between the jaws before the trap is sprung, thereby making sure of its capture.

The invention will be best understood from a consideration of the following detailed description taken in connection with the accompanying drawing forming a part of the present invention with the understanding, however, that the invention is not confined to any strict conformity with the showing of the drawing but may be changed or modified so long as such changes or modifications mark no material departure from the salient feature of the invention as expressed in the appended claims.

Figure 1:
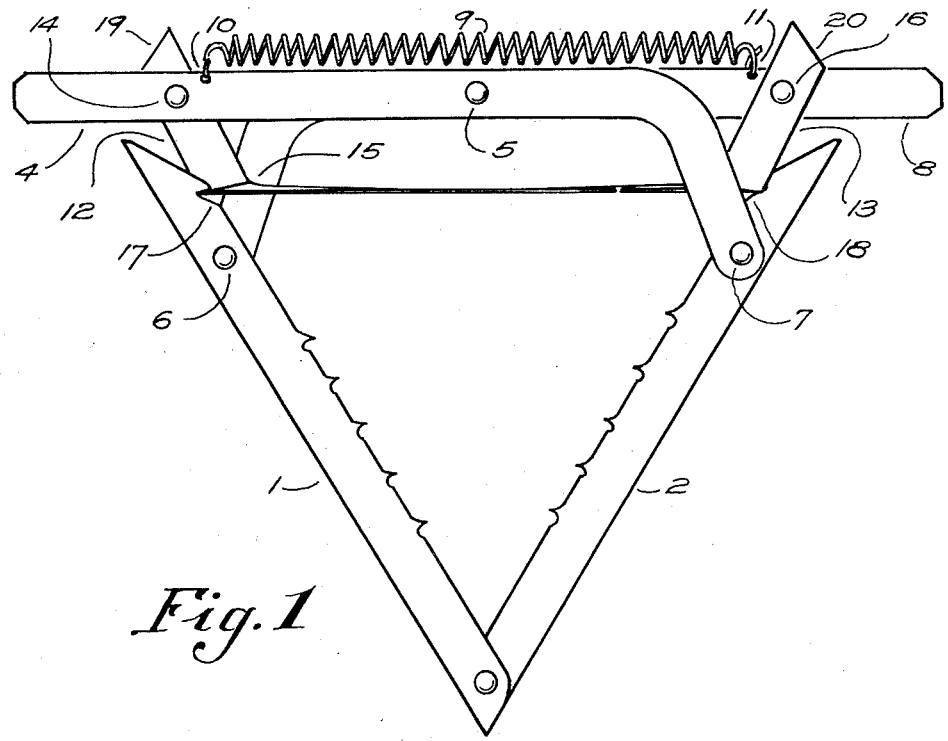
Figure 1 is a view in side elevation of a trap embodying the present invention.

Referring more particularly wherein like numerals of reference indicate corresponding parts throughout the several views, the notched jaws 1 and 2 are joined together at the bottom by the pintle 3 and pivot thereon. The bar arm 4 is hinged on the jaw 2 by the pivot 7, and the bar arm 8 is hinged on the jaw 1 by the pivot 6. The arms 4 and 8 are joined together by the pintle 5 and pivot thereon. A coil spring 9 is secured to the arm 4 at 10 and to the arm 8 at 11, so that when the trap is set, the spring is in an extended position and lies along the top of the arms 4 and 8 and tending to bring the ends of the arms 4 and 8 together by pivoting them on the pintle 5, thereby closing the jaws 1 and 2.

Figure 2:
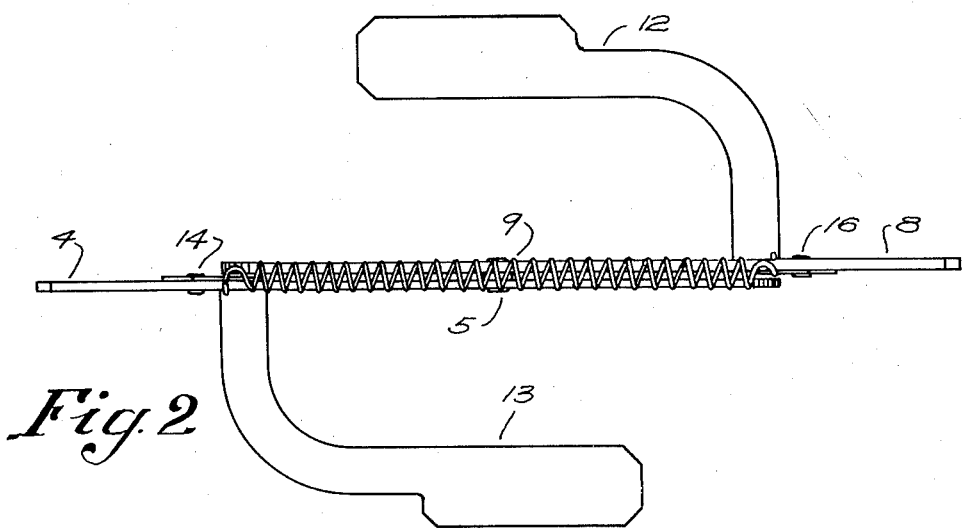
Figure 2 is a top plan view of the trap set.

The triggers 12 and 13 are independently attached to each jaw, the trigger 12 consisting of a bar pivoted on the arm 4 at 14. The trigger 12 is further twisted at 15 at a right angle to the jaw 1 and further curved so that both triggers when set lie in a plane at right angles to the jaws, as shown in Figure 2. The trigger 13 is similarly pivoted in the arm 8 at 16 and is twisted at right angles to the jaw 2. Portions 19 and 20 of the respective triggers extend above the respective arms 4 and 8, and when brought into contact with the spring 9, limit the pivotal movement of the triggers, which also may be accomplished by a flange on the trigger being brought into contact with the arms 4 or 8.

The trigger 12 is latched into the jaw by the notch 17, and the trigger 13 is latched into the jaw 2 by the notch 18. Each trigger extends laterally on either side of the jaws and lie in or on the ground directly above the animal run so that a very slight displacement of the ground or contact therewith by the animal will serve to unlatch the trigger from the jaw. It will be noticed that each trigger is independent of the other and latched into notches in separate jaws.

The arm 4 cannot move to spring the trap until the trigger 12 is unlatched, and similarly the arm 8 cannot move to spring the trap until the trigger 13 is unlatched. This feature is very important because it insures operation only when both triggers are unlatched, so that an animal approaching the trap unlatches the trigger first on one side of the trap and then when passing between the jaws unlatches the second trigger, which springs the trap. It will also be observed that it is only an upward movement of the triggers which will serve to unlatch them, and that the whole trap, when set, is practically flush with the ground where it is out of the way. It is also capable of being concealed, and furthermore will not be sprung by force from above.

Where both triggers are latched in the notches in the respective jaws, no movement of the jaws toward each other is possible, but when both triggers are unlatched the spring 9 causes the upper part of the arms 4 and 8, pivotally joined at 5, to come together, and the lower part of the arms 4 and 8, respectively, pivotally mounted on the jaw 1 at 6 and on jaw 2 at 7, to also approach each other and force the jaws together.

I do not wish to be limited as to details of construction as these may be modified in many particulars without departing from the spirit of my invention.

Having thus fully described my invention, what I claim as new and desire to secure by Letters Patent is:—

1. An animal trap comprising jaw members, means for pivotally connecting the jaw members, an arm pivotally connected to each jaw member, a spring connecting the arms, said arms being pivoted to each other, a trigger pivoted to each arm, each jaw member having a notch adapted to be engaged by said trigger to hold said trigger in a predetermined position, said triggers being adapted to be independently released from said jaws and said jaws being adapted to be moved towards each other by said spring when both triggers have been released.

2. An animal trap comprising jaw members, means for pivotally connecting the jaw members, an arm pivotally connected to each jaw member, a spring connecting the arms, said arms being pivoted to each other, a trigger pivoted to each arm and means thereon to limit the motion of said trigger, each jaw member having a notch adapted to be engaged by said trigger to hold said trigger in a predetermined position, said triggers being adapted to be independently released from said jaws and said jaws being adapted to be moved towards each other by said spring when both triggers have been released.

3. An animal trap comprising jaw members, means for pivotally connecting the jaw members, an arm pivotally connected to each jaw member, a spring connecting the arms, said arms being pivoted to each other, a trigger pivoted to each arm, a portion of said triggers being laterally disposed on either side of said jaws, each jaw having a notch adapted to be engaged by said trigger to hold said trigger in a predetermined position, said triggers being adapted to be independently released from said jaws and said jaws being adapted to be moved towards each other by said spring when both triggers have been released.

4. An animal trap comprising jaw members, means for pivotally connecting the jaw members, an arm pivotally connected to each jaw member, a spring connecting the arms, said arms being pivoted to each other, a trigger pivoted to each arm, each jaw member having a notch adapted to hold said triggers in a position laterally disposed on either side of said jaw and in a plane extending across the upper portion of said jaws, said triggers being adapted to be independently released from said jaws and said jaws being adapted to be moved towards each other by said spring when both triggers have been released.

HANS PETERSON.